United States Patent [19]

Dooley

[11] 4,133,222

[45] Jan. 9, 1979

[54] REMOTE CONTROLLER

[76] Inventor: Richard A. Dooley, 400 S.Westwood Ave., Toledo, Ohio 43609

[21] Appl. No.: 843,516

[22] Filed: Oct. 19, 1977

[51] Int. Cl.² ............... F16C 1/10; F16H 1/04; B66F 3/02

[52] U.S. Cl. ................... 74/501 R; 74/422; 254/95; 74/501.5 H

[58] Field of Search ............ 74/501 R, 501 M, 501 P, 74/501.5 R, 501.5 H, 502, 503, 504, 505, 506, 507, 508, 509, 510, 489, 486, 487, 422; 254/95

[56] References Cited

U.S. PATENT DOCUMENTS

| 2,457,910 | 1/1949 | McLaren et al. | 74/501 R |
|---|---|---|---|
| 2,964,968 | 12/1960 | Millington et al. | 74/501 P X |
| 3,287,990 | 11/1966 | Ellinger | 74/501 R |
| 3,464,286 | 9/1969 | McCabe | 74/501 R |
| 3,464,287 | 9/1969 | McCabe | 74/501 R |
| 3,509,782 | 5/1970 | Molnar | 74/501 R |
| 3,552,218 | 1/1971 | Gregory, Jr. | 74/501 R |
| 3,841,171 | 10/1974 | Young, Jr. | 74/502 X |

Primary Examiner—Samuel Scott
Assistant Examiner—Don E. Ferrell
Attorney, Agent, or Firm—Allen D. Gutchess, Jr.

[57] ABSTRACT

An improvement is provided for a mechanical push-pull, ball-bearing, remote controller. A basic controller of this type is commercially available and includes an elongate center race to which force is applied, two outer races, at least one of which is anchored at its ends to provide a reaction element, and ball guides carrying a plurality of balls between the center race and the outer races. The improvement in the remote controller comprises means for controlling the movement of the ball guides, particularly relative to the center race, to prevent the ball guides from contacting the end anchors of the remote controller during operation and damaging the guides.

20 Claims, 23 Drawing Figures

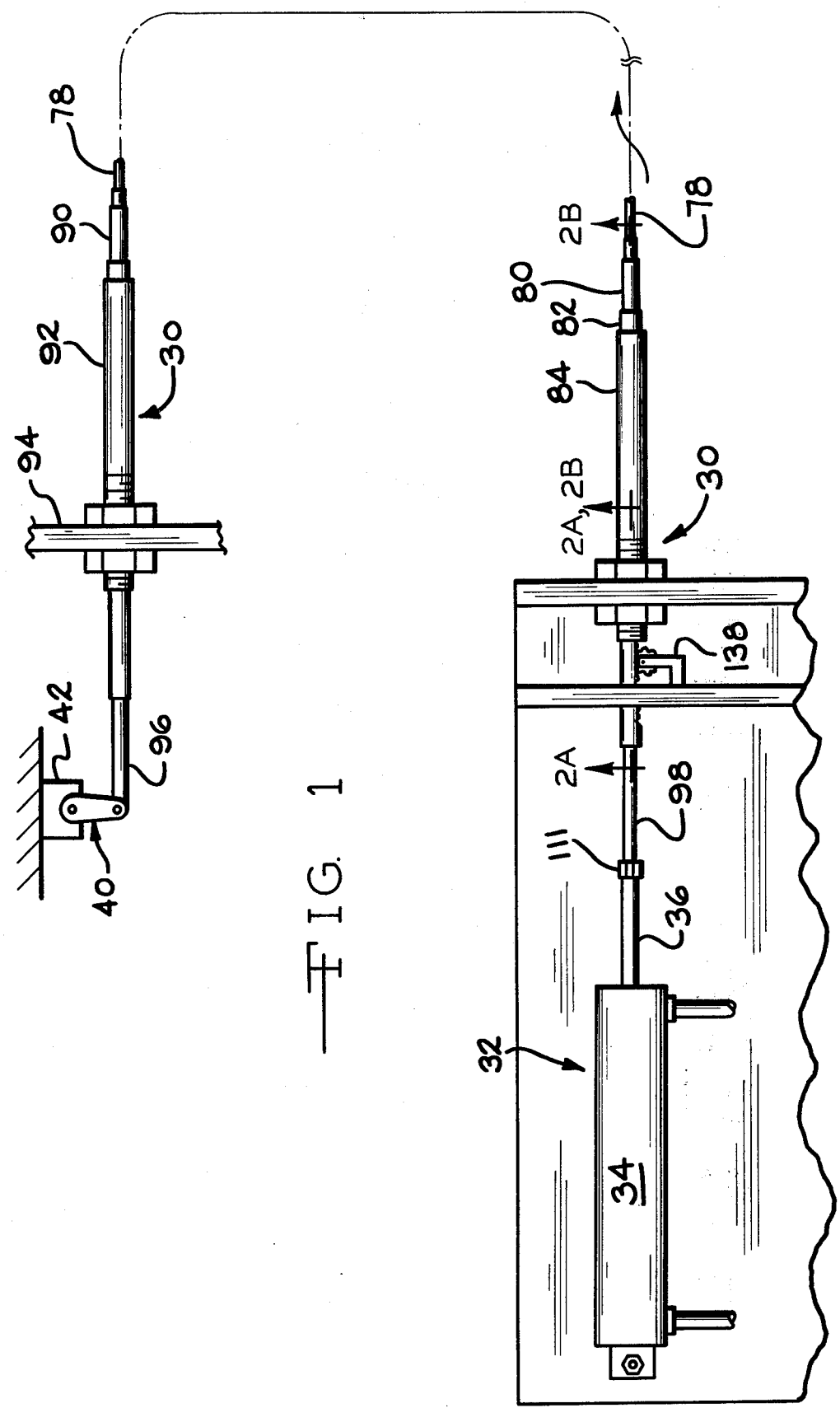

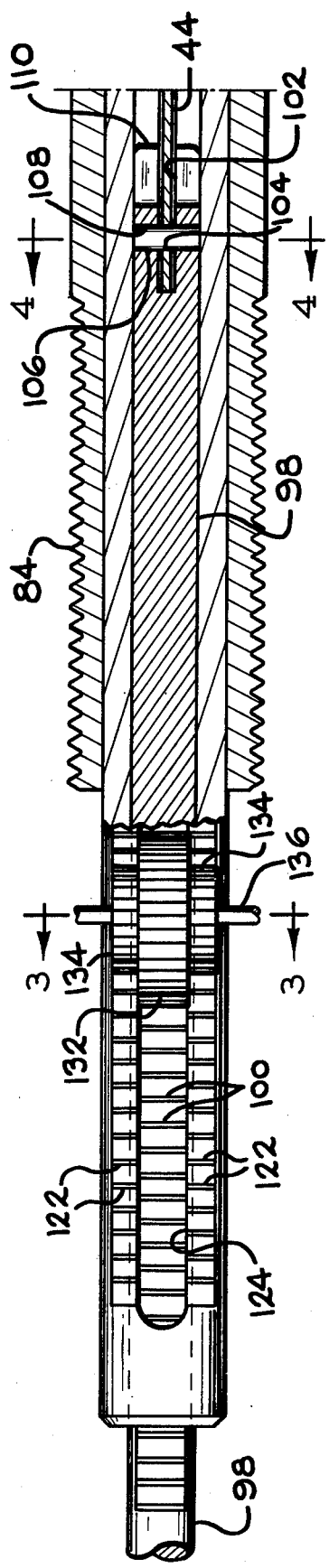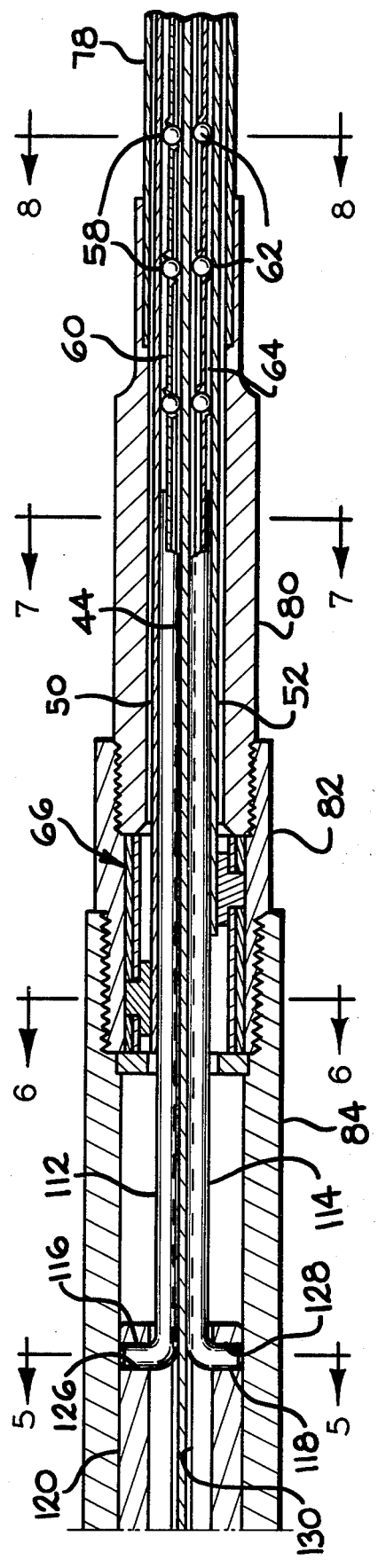

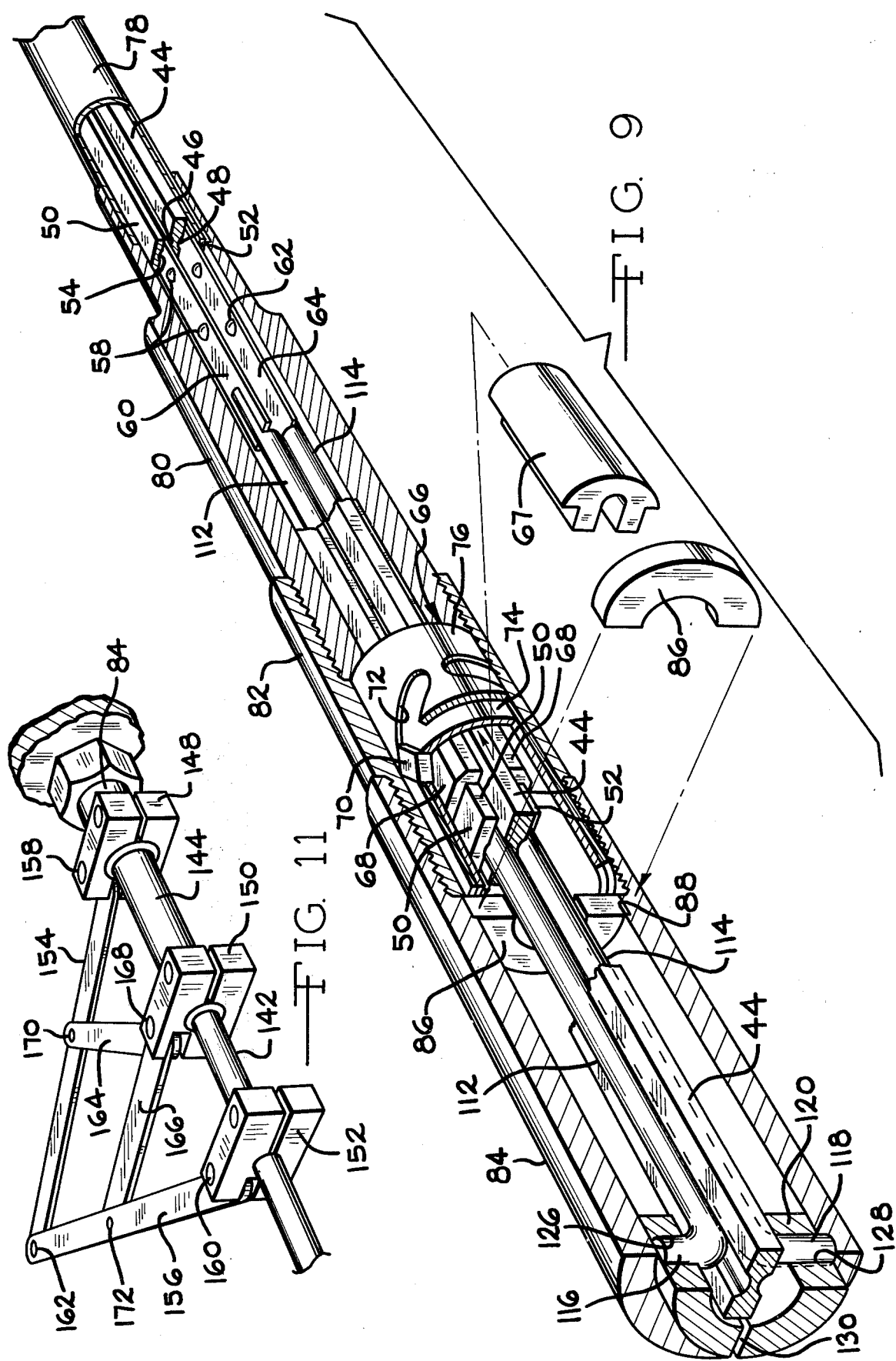

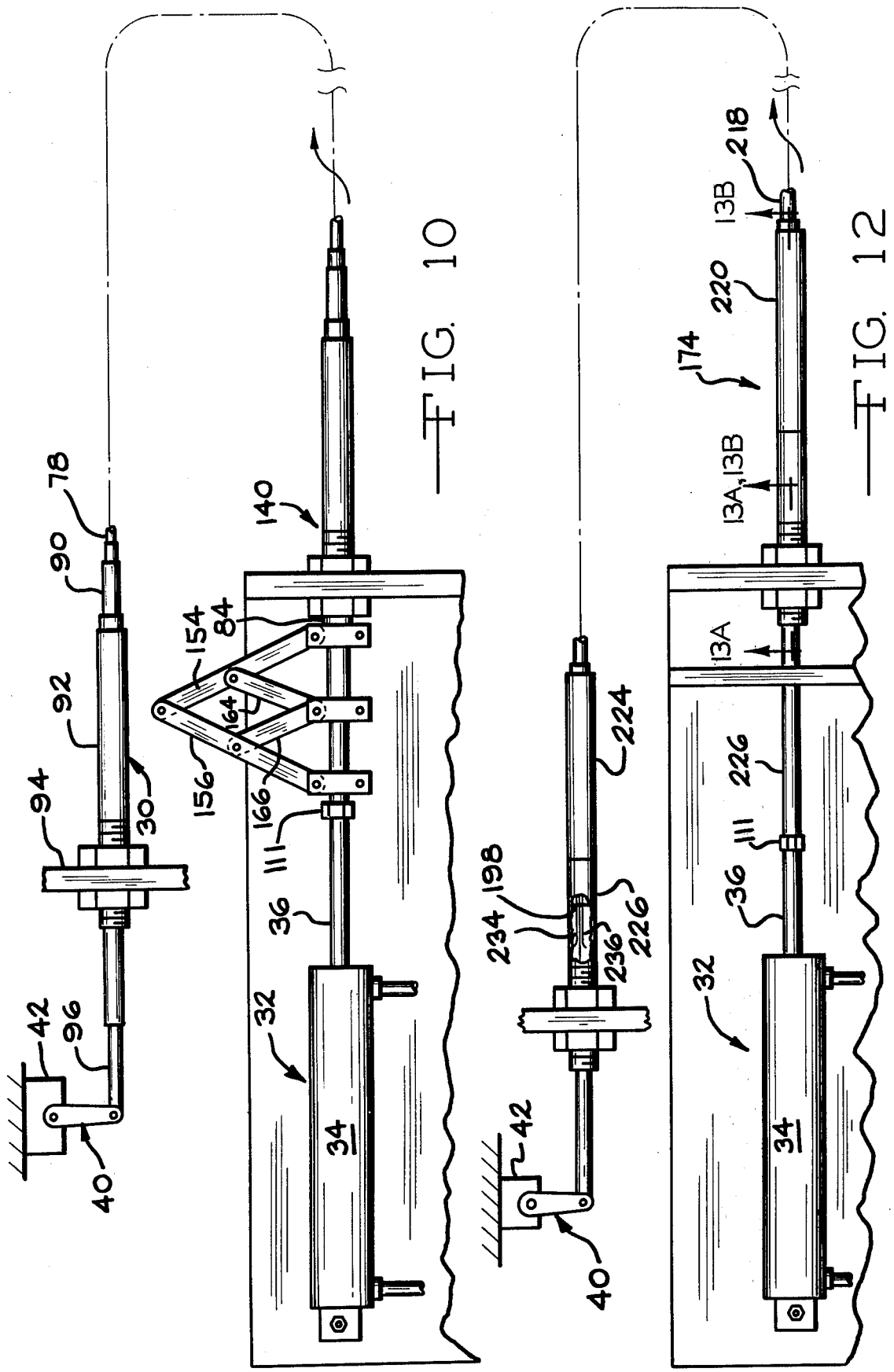

REMOTE CONTROLLER

This invention relates to improvements in a mechanical push-pull, ball-bearing, remote controller.

A remote controller with which the invention is concerned enables an input at one end to be transmitted to an output at a remote end, with the controller basically operating in the manner of a Bowden cable mechanism. However, the controller does not have the friction, backlash, limited length and load, and installation problems commonly encountered with Bowden cables. The ball-bearing, remote controller includes a center ball bearing race through which a force is applied from an input at one end of the controller to an output at the other end. Two outer races are located on opposite sides of the center race with at least one of the other races being anchored at both ends in a fixed position to provide a reaction element against the force applied to the center race. This outer race provides the same function as the outer sheath or conduit of a Bowden control cable. Between the center race and each of the outer races, there is a ball guide carrying a plurality of bearing balls extending substantially the length of the three races.

Heretofore, the ball guides have been unrestricted in their movement, being allowed to float or roll freely back and forth between their respective races. In theory, and substantially in practice, the ball guides move half the distance of the center race so that when the center race moves with a two-inch stroke, for example, the ball guides will move one inch in the same direction. In actual practice, however, the movement of the ball guides will not be exactly one-half the movement of the center race so that the ball guides may tend to move or work toward one of the end anchors of the remote controller. Particularly when the center race may be moved through a series of relatively short strokes and then moved through a longer one, a ball guide can contact one of the controller end anchors during the longer stroke and severely damage the end of the guide.

The present invention provides means for controlling or restricting the movements of the ball guides in a mechanical push-pull, ball-bearing, remote controller to prevent contact with the end anchors and damage to the guides. The ball guides can be controlled in a manner to assure that they will only move a given distance relative to the center race to provide positive mechanical control of the movement, rather than mere sliding movement of the balls relative to the center and outer races. The ball guides can also be mechanically controlled to limit their physical movement toward the end anchors to avoid contact therewith and damage.

It is, therefore, a principal object of the invention to provide a mechanical push-pull, ball-bearing, remote controller with means for controlling the movement of the ball guides thereof to prevent damage thereto.

FIG. 1 is a somewhat schematic plan view of a preferred embodiment of the invention;

FIG. 2A is a view in longitudinal cross section, but with a portion in elevation, taken generally along the line 2A—2A of FIG. 1;

FIG. 2B is a view in longitudinal cross section taken along the line 2B—2B of FIG. 1;

Figure 3:
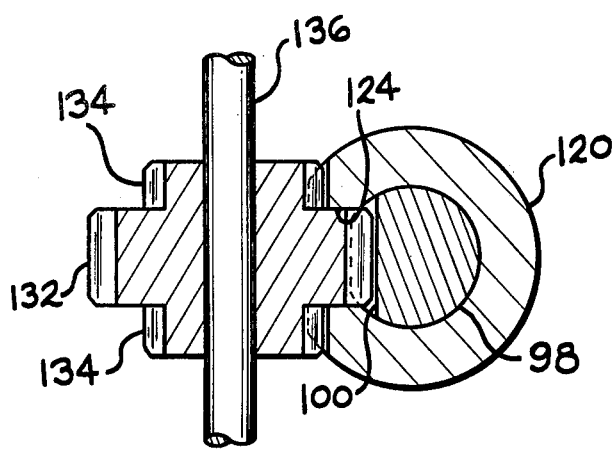
Figure 4:
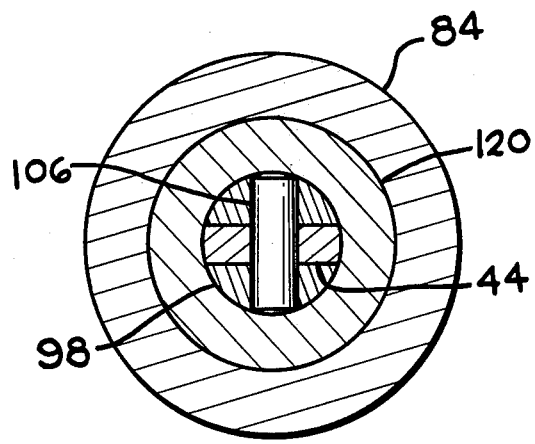
Figure 5:
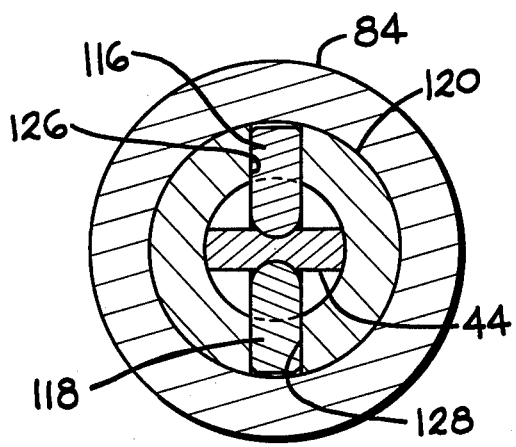
Figure 13A:
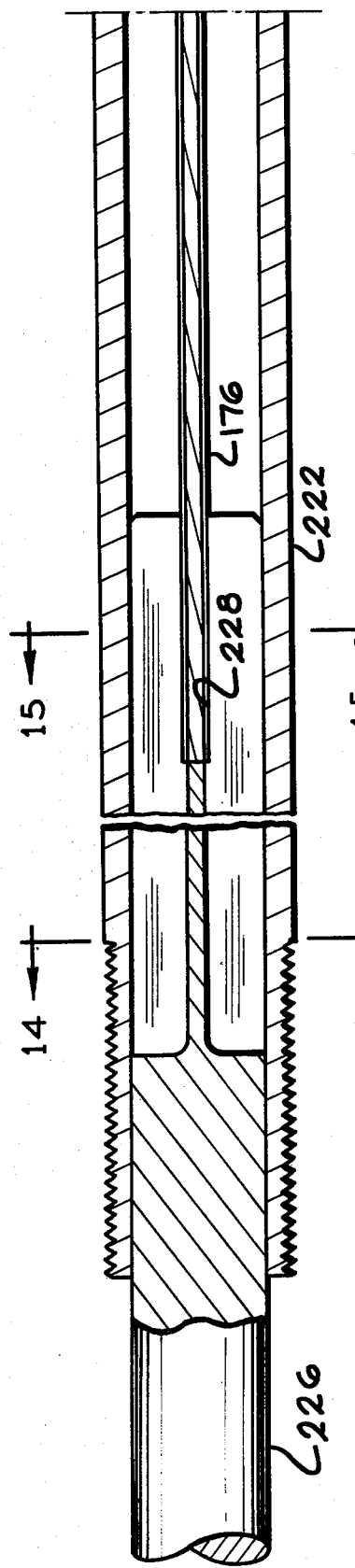
Figure 13B:
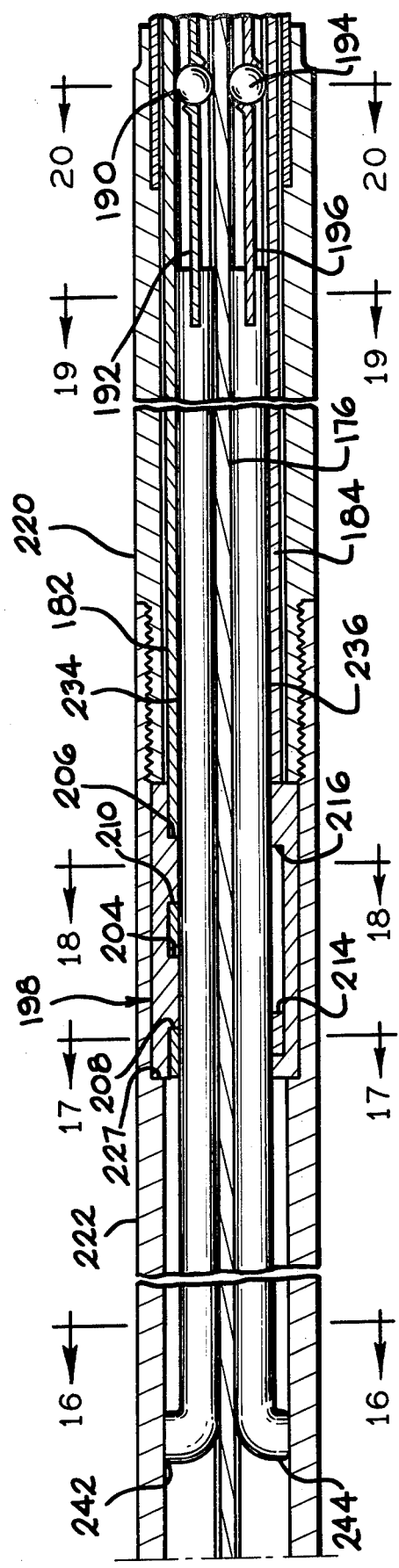
Figure 14:
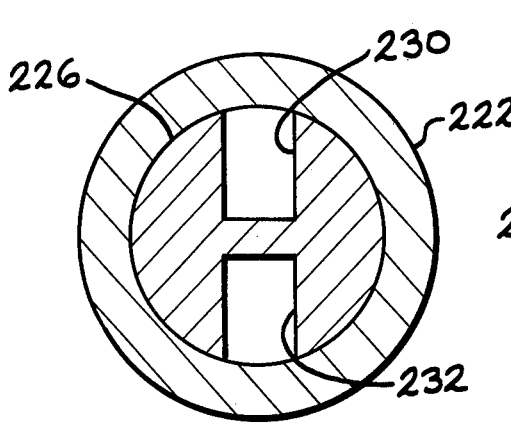
Figure 15:
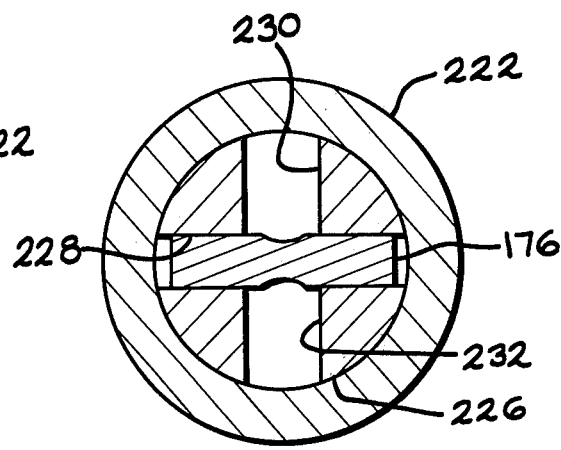
Figure 16:
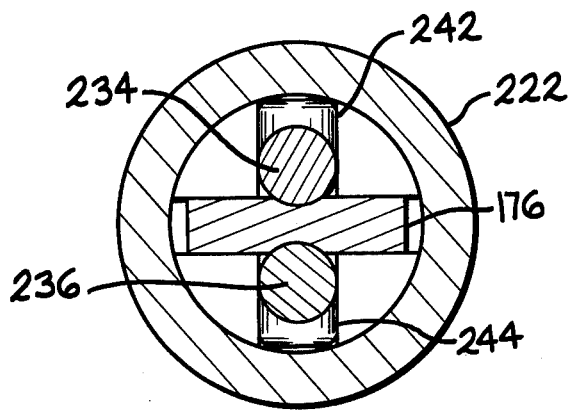
Figure 17:
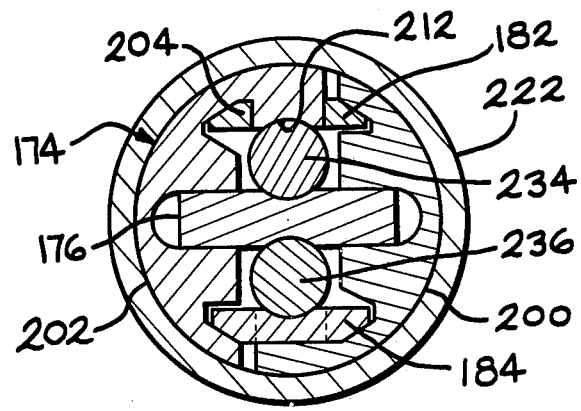
Figure 18:
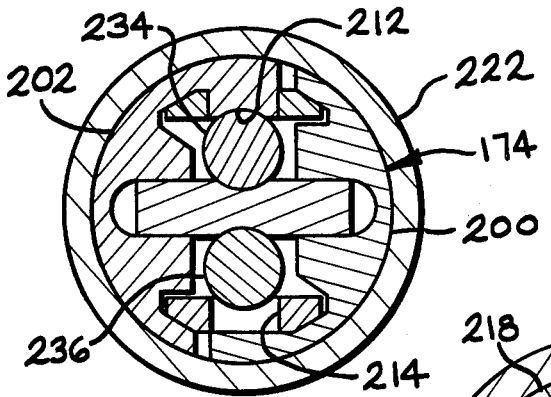
Figure 19:
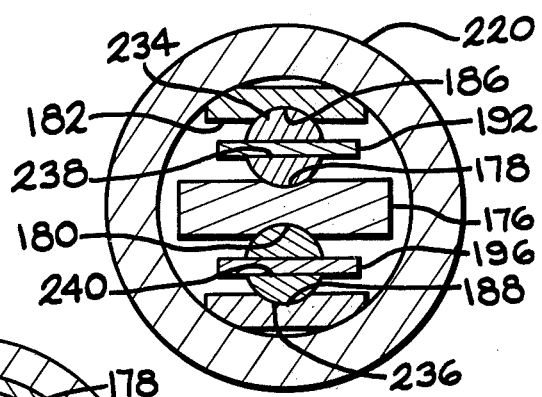
Figure 20:
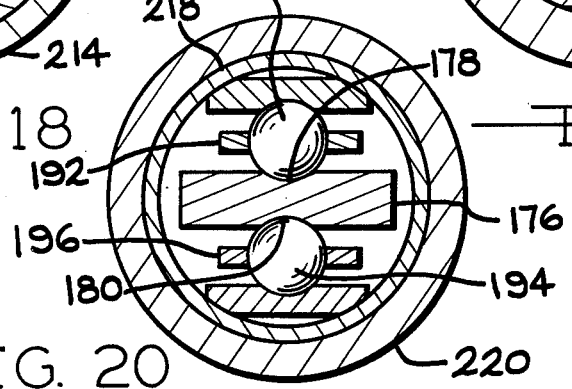
Figure 21:
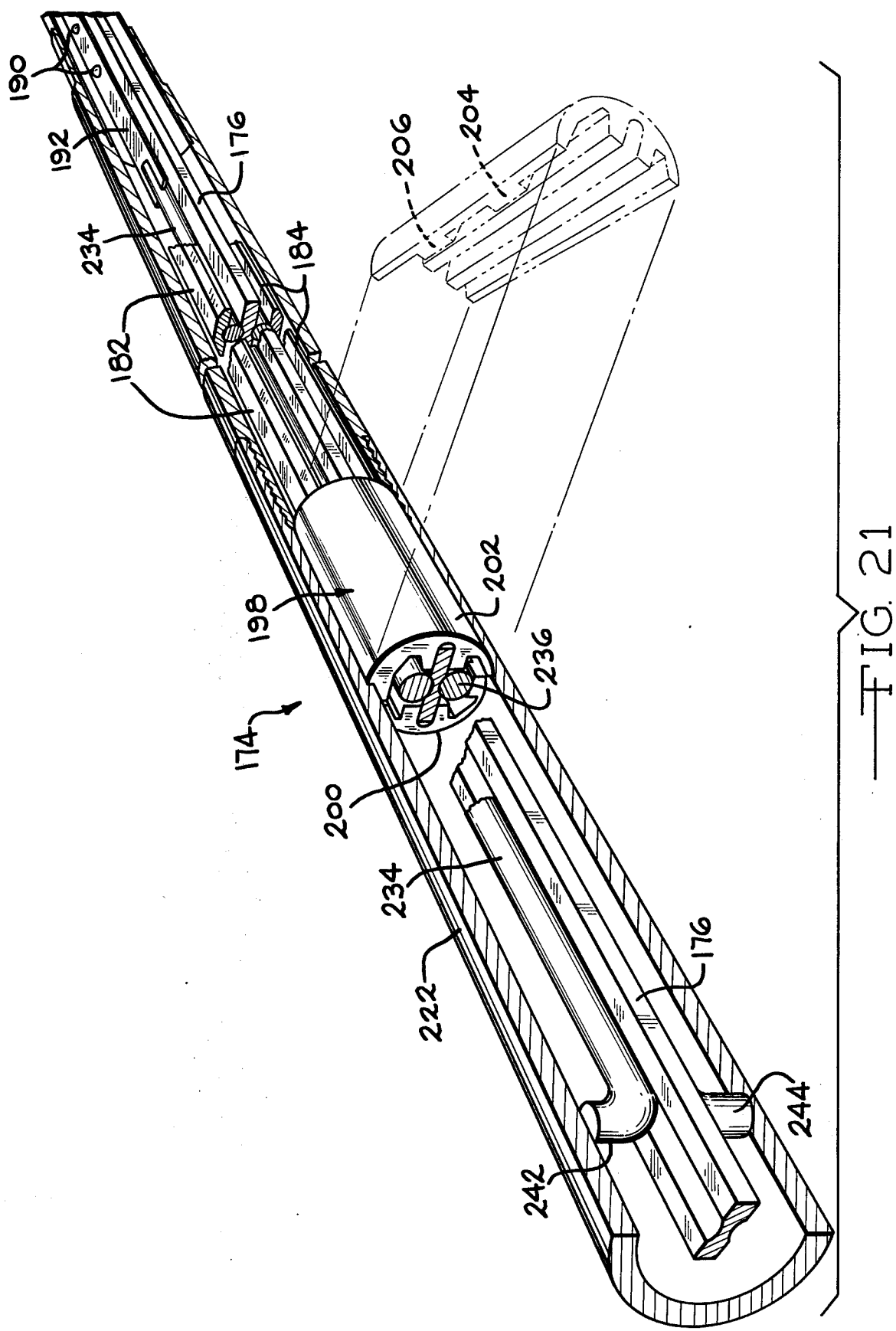

FIGS. 3 and 4 are views in transverse cross section taken along the lines 3—3 and 4—4 of FIG. 2A;

FIGS. 5-8 are views in transverse cross section taken along the lines 5—5, 6—6, 7—7, and 8—8 of FIG. 2B;

FIG. 9 is a partially exploded, fragmentary view in perspective of a portion of the remote controller of FIGS. 1-8;

FIG. 10 is a somewhat schematic plan view of another embodiment of the invention;

FIG. 11 is a fragmentary view in perspective of a portion of the remote controller of FIG. 10;

FIG. 12 is a somewhat schematic plan view of a further embodiment of the invention;

FIG. 13A is a view in longitudinal cross section taken along the line 13A—13A of FIG. 12;

FIG. 13B is a view in longitudinal cross section taken along the line 13B—13B of FIG. 12;

FIGS. 14 and 15 are views in transverse cross section taken along the lines 14—14 and 15—15 of FIG. 13A;

FIGS. 16-20 are views in transverse cross section taken along the lines 16—16, 17—17, 18—18, 19—19, and 20—20 of FIG. 13B; and FIG. 21 is a partially exploded, fragmentary view in perspective of the remote controller of FIGS. 12-20.

Referring particularly to FIG. 1, a push-pull, ball-bearing, remote controller embodying the invention is indicated at 30. Moving means 32 for the controller is shown as a fluid-operated ram having a cylinder 34 and a piston rod 36. At the remote end of the controller 30 is means 38 responsive to the moving means 32 and is specifically shown as a lever arm 40 pivotally connected to a support 42. When fluid is applied to the blind end of the cylinder 34 and the piston rod 36 is extended, the controller 30 causes the lever arm 40 to move in a clockwise direction. When fluid is supplied to the rod end of the cylinder 34, the piston rod 36 is retracted and the controller 30 causes the lever arm 40 to move in a counterclockwise direction.

The controller 30 thus functions in the same manner as a Bowden cable but has several advantages. The controller 30 does not have the amount of friction, backlash, limited length and load, and installation problems which are commonly encountered with Bowden cables. Considerably less force is needed by the moving means 32 to operate the responsive means 40. Also, a given amount of movement of the moving means 32 will result in substantially the same amount of movement of the responsive means 40. The length of the controller 30 can also be much greater than that for Bowden cables and a greater force can be applied through the controller than through conventional Bowden cables.

Referring now more particularly to FIGS. 2A-9 the controller 30 includes a center race 44 with opposite central grooves 46 and 48 therein. The center race 44 transmits the force or movement from the moving means 32 to the responsive means 40. Outer races 50 and 52 having grooves 54 and 56 are located on opposite sides of the center race 44 and provide the reactive force for the controller 30. The outer races 50 and 52 thus function the same as the sheath of a Bowden cable, the sheath supplying the reactive force for the Bowden cable. In order to supply the reactive force, at least one of the races 50 and 52 must be anchored at the ends of the controller, as will be discussed subsequently.

A plurality of upper bearing balls 58 are located between the center race 44 and the upper outer race 50 and are maintained in spaced relationship by a ball guide 60. Similarly, a plurality of lower bearing balls 62 are located between the center race 44 and the lower outer race 52 and are maintained in spaced relationship by a lower ball guide 64. Heretofore, the ball guides 60 and 64 have been unrestricted in their movement relative to the center race 44 and the outer races 50 and 52, being allowed to float freely back and forth as the center race is moved. In theory, and also substantially in practice, the ball guides move half the distance of the center race. Thus, if the center race moves two inches toward the responsive means 40, both of the ball guides 60 and 64 will move in the same direction but half the distance. In actual practice, it has been found that the movement of the ball guides will not always be exactly one half the movement of the center race. Consequently, the ball guides may tend to move or work toward one of the end anchors for the outer races of the remote controller during operation thereof. Particularly when the center race may be moved through a series of relatively short strokes back and forth and then moved through a longer stroke, a ball guide may contact one of the controller end fittings or anchors during the longer stroke and receive severe damage.

The controller 30, in this instance, has both of the outer races 50 and 52 anchored so that both can supply the reactive force in the direction opposite to the direction in which the force is applied through the center race 44. The races 50 and 52 are held at each end in an anchor 66 which basically is part of the commercially-available controller and will not be discussed in detail. The anchor 66 has two modified spacers 67 to maintain the components in proper relationship and two connections 68 which are affixed to the races 50 and 52, as by crimping the connections in shallow notches of the outer races. Each of the connections has a rhombic projection 70 which extends outwardly through diagonal slots 72 extending in opposite directions in two concentric sleeves 74 and 76 which surround the spacers 67, the connections 68, and the three races 44, 50 and 52. The connections 68 and the projections 70 hold the outer races 50 and 52 in fixed positions except when the controller is curved between the moving means 32 and the responsive means 40. If the controller is curved toward the outer race 50, for example, then the ends of the outer race 52 on the outer part of the curve will terminate short of the ends of the race 50 on the inside, as shown in FIG. 2B. In order to accommodate this movement, the projections 70 in the slots 72 move in opposite directions for the two races so that the ends of the races can accordingly move. As the projection 70 of the outer race 50 tends to move toward the ram 32, it cams the sleeves in opposite directions with the sleeve 74 moving counterclockwise and the sleeve 76 moving clockwise, as viewed in FIG. 9. The projection 70 moves in the opposite direction an equal amount. Hence, the two races remain anchored and still provide reactive forces through the anchor 66.

The controller 30 also includes an outer flexible sheath 78 which holds the various components against movement in a radially-outward direction but the sheath does not take any of the reactive load or force, as in a Bowden cable. The sheath 78 is suitably affixed in the end of a sheath fitting 80 which is threaded into a nipple 82. The nipple 82, in turn, is threaded into an end fitting 84 of the controller. With this arrangement, the anchor 66 is held in a fixed position between the end of the sheath fitting 80 and a split washer 86 held against an annular shoulder 88 in the end fitting 84 by the end of the nipple 82. At the other end of the sheath 78, the controller 30 has a sheath fitting 90 (FIG. 1) connected to an end fitting 92 held by a support 94. A connecting rod 96 is connected to an end of the center race 44 within the end of the fitting 92 and extends out the end thereof where it is pivotally connected to the responsive means 40. The ends of the controller 30 are otherwise similar, each containing the anchor 66.

In accordance with the invention, the center race 44 is connected to a rod or center gear rack 98 at one end (FIGS. 2A, 3 and 4) having gear teeth 100 formed longitudinally thereon. The gear rack, which is substantially circular in cross section, has a slit 102 at the front end which receives the end of the center bearing race 44 which has a hole 104 therein receiving a pin 106 extending through a bore 108 in the gear rack 98. The rack 98 also has a U-shaped notch 110 in the forward end, the purpose of which will be discussed subsequently. The opposite end of the gear rack 98 is connected by a suitable threaded sleeve or nut 111 (FIG. 1) to the piston rod 36.

Figure 6:
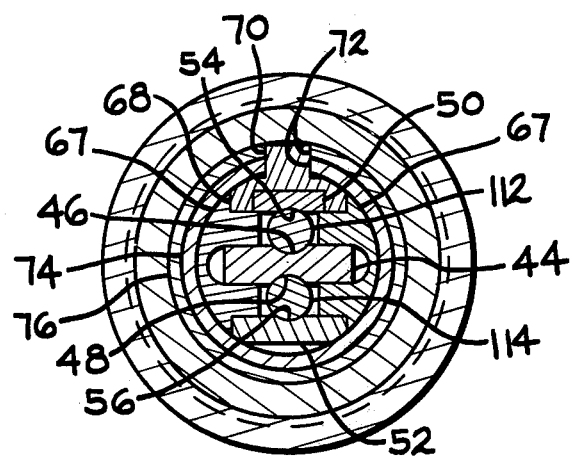
Figure 7:
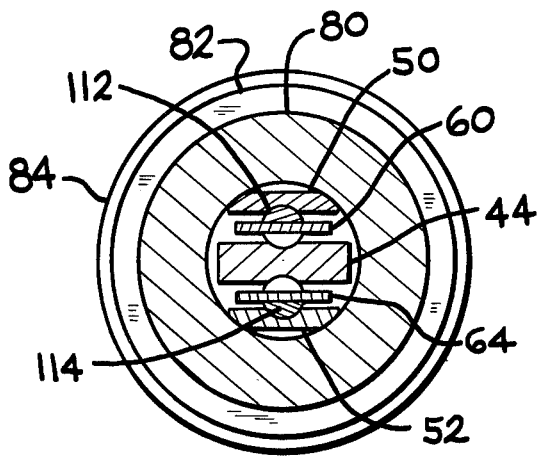
Figure 8:
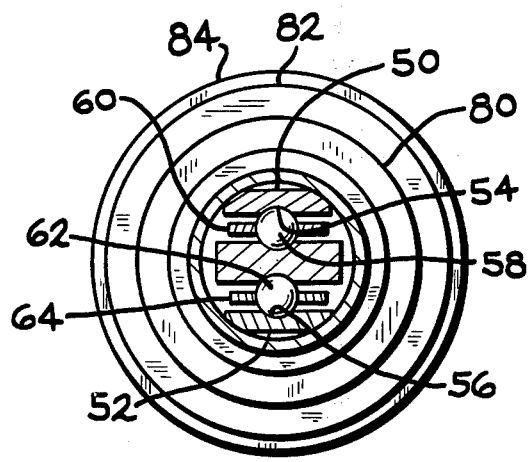

The ball guides 60 and 64 have elongate members or rods 112 and 114 (FIGS. 2B, 6, and 9) affixed to the ends thereof, as by silver solder. The upper rod 112 extends through the grooves 46 and 54 in the center race 44 and the upper outer race 50, particularly as shown in FIG. 6, while the lower rod 114 extends through the grooves 48 and 56 in the center race 44 and the lower outer race 52. These rods have out-turned ends 116 and 118 which are connected to a sleeve or outer gear rack 120 located around the gear rack 98. The outer gear rack 120 has gear teeth 122 (FIG. 2A) therein with a central elongate slot 124 through which the teeth 100 of the gear rack 98 are exposed. The out-turned ends 116 and 118 of the rods 112 and 114 are received in opposite openings 126 and 128 in the end of the outer gear rack 120. The rack 120 also has an end slit 130 (FIG. 9) cut therein to enable the ends on each side of the slit to be spread slightly in order to receive the out-turned ends 116 and 118 of the members 112 and 114. The aforementioned U-shaped notch 110 in the end of the center gear rack 98 receives the out-turned ends of the rods when the center rack is at the forwardmost position so that the ends of the center rack 98 and the outer rack 120 will lie in the same plane adjacent the slit washer 86 when at the forward extremities of their strokes.

Referring to FIGS. 1, 2A and 3, a large central pinion gear 132 meshes with the teeth 100 of the rack 98 while two smaller outer pinion gears 134 mesh with the outer teeth 122 of the outer rack 120. These three gears are functionally integral and are rotatably mounted on a common axle 136 which, in turn, is supported by a suitable bracket 138 of FIG. 1. The teeth of the large pinion gear 132 number twice those of the smaller pinion gears 134. Consequently, when the gear rack 98 is moved by the piston rod 36 to move the center gear race 44, the large pinion gear 132 is driven, which, in turn, rotates the outer pinion gears 134. These mesh with the teeth 122 of the outer gear rack 120 to cause that gear rack to move one half as far as the center gear rack 98. The outer gear rack 120, being connected directly to the ball guides 60 and 64, through the elongate members or rods 112 and 114, likewise causes the ball guides and the balls 58 and 62 to move equal distances, which distances are equal to one-half the distance the center race 44 is moved. Thus, the movement of the two ball guides 60 and 64 is always one-half that of the center race and there is no skidding of the bearing balls 58 and 62 relative to any of the races. Further, and most importantly, the ball guides 60 and 64 never creep toward one end or the other of the controller 30 and, consequently, there is no chance for the ends of the ball guides 60 and 64 to contact the anchors 66 and to damage the guides, as has heretofore occured.

Referring to FIGS. 10 and 11, a modified controller embodying the invention is indicated at 140. The controller 140 also achieves the result of controlling the movement of the ball guides 60 and 64 to avoid damage thereto and controls the movement in a two-to-one ratio again with respect to the center bearing race 44. The components of the controller 140 are essentially the same as those of the controller 30 except as noted below.

In this instance, a center rod 142 is substituted for the center rod 98 and is connected to the piston rod 36 as before. In addition, an outer sleeve 144 is substituted for the sleeve 120. The sleeve 144 is connected to the ball guides 60 and 64 in the same manner as in the controller 30 with the center rod 142 also being connected to the center race 44 in the same manner as before.

The end of the fitting 84 has an outer clamp 148 thereon and suitably affixed thereto, with the outer end of the sleeve 144 having an intermediate clamp 150 affixed thereto. In addition, the rod 142 has an outer clamp 152 affixed to it. Two outer links 154 and 156 have ends pivotally connected by pins 158 and 160 to the clamps 148 and 152, respectively, with the outer ends of the links 154 and 156 being pivotally connected together by an apex pin 162. Two intermediate links 164 and 166 have inner ends pivotally connected together and to the intermediate clamp 150 by a pin 168. The outer ends of the links 164 and 166 are pivotally connected to intermediate points of the links 154 and 156 by pivot pins 170 and 172.

The inner end of the outer link 154 is pinned in a fixed pivotal position by the pin 158 relative to the immovable end fitting 84. The inner end of the outer link 156, pinned to the clamp 152, moves with the rod 142 and the inner race 44 when so moved by the moving means 32. This movement will then cause the inner ends of the intermediate links 164 and 166, along with the clamp 150 and the sleeve 144 to move a lesser distance, along with the ball guides 60 and 64, than the distance of movement of the inner race 44. With the intermediate links 164 and 166 pivotally connected to middle points on the outer links 154 and 156, and with the links 164 and 166 being one-half the length of the links 154 and 156, the movement of the ball guides 60 and 64 will equal one-half the movement of the center race 44 in the same manner as results with the rack and pinion arrangement of the controller of FIGS. 1–9. Thus, the bearing balls 58 and 62 will move a controlled distance relative to the center race and the balls will not skid relative to the races. In particular, the ends of the ball guides cannot contact the end anchors and be damaged.

Referring to FIGS. 12–21, a modified push-pull, ball-bearing, remote controller embodying the invention is indicated at 174. The controller 174 is also commercially available and has most of the advantages of the controllers of FIGS. 1 and 10. The controller 174 differs primarily in that only one outer race is anchored instead of both. As such, the controller cannot be flexed or curved as much between the moving means and the responsive means, but the anchor for the single outer race is less complicated and less expensive than that of the controller 30 in which both outer races are anchored. The invention embodied in the controller 174 controls the movement of the ball guides by limiting the extent to which they can move toward the anchors at the ends of the controller, with the movement being largely unrestricted between limits near the anchors.

The controller 174 can employ the moving means or ram 32 and the responsive means or lever arm 40, similar to the controller 30. The controller 174 includes a center race 176 with opposite upper and lower grooves 178 and 180. Outer races 182 and 184 having grooves 186 and 188 are located on opposite sides of the center race. A plurality of upper bearing balls 190 are located between the center race 176 and the upper outer race 182 and are maintained in spaced relationship by a ball guide 192. Similarly, a plurality of lower bearing balls 194 are located between the center race 176 and the lower outer race 184 and are maintained in spaced relationship by a lower ball guide 196.

The controller 174, in this instance, has only the upper outer race 182 anchored to supply the reactive force in the direction opposite to the direction in which the force is applied through the center race 176. The race 182 is held at each end in an anchor 198 which basically is part of the commerically-available controller. The anchor is made in two modified parts 200 and 202 for assembly purposes. The anchor part 202 has two projections 204 and 206 (FIGS. 13B, 17, and 18) which extend into openings 208 and 210 formed in the upper race 182. The projections 204 and 206 also have arcuate lower grooves 212, the purpose of which will be discussed subsequently. The lower outer race 194 has an elongate opening 214 therein through which an end projection 216 of the anchor 198 extends, this projection also having an arcuate groove. In this manner, the lower race 184 can float a distance almost equal to the length of the anchor 198 while the upper outer race 182 remains in a fixed position.

Like the controller 30, the controller 174 has a flexible outer sheath 218 which holds the various components against radial movement but does not support any of the reactive load. The sheath is suitably affixed to the end of a sheath fitting 220 which is threaded into an end fitting 222. At the other end, the sheath 218 is connected to a sheath fitting 224 which is threaded into an end fitting 226. The anchor 198 is held between the end of the sheath fitting 220 and a shoulder 227 of the end fitting 222. Both ends of the controller 174, in this instance, are identical in all respects (see also FIG. 12).

The center race 176 is affixed to a rod 226 which, in turn, is connected to the piston rod 36 for the ram 32. Referring to FIGS. 13A and 15, the end of the center race 176 is received in slots and brazed. The end of the rod 226 also has longitudinally-extending grooves 230 and 232 therein which will be discussed subsequently.

In accordance with the invention, the ball guides 192 and 196 have elongate members or rods 234 and 236 affixed to common ends thereof, the ball guides have end slits 238 and 240 receiving ends of the rods 234 and 236 and being silver soldered thereto. The rods also have out-turned ends 242 and 244 on the other side of the anchor 198 with intermediate portions of the rods extending through the appropriate passages in the anchor 198 formed by the projection grooves and the center race grooves. The ends 242 and 244 contact the anchor 198 when the ball guides 192 and 196 move far enough toward the right, as viewed in FIG. 13B, and thus limit the extent to which the ball guides can move. The out-turned ends can also be received in the grooves 230 and 232 of the rod 226 when the rod and the center race 176 are moved toward the right far enough.

During the operation of the controller 174, the ball guides 192 and 196 move in the direction the center race 176 moves but at only half the distance, in the usual manner, However, if over a period of time either of the ball guides should work its way toward one of the end anchors 198 to the point that it may contact that anchor and cause damage to the guide upon more extended movement of the center race 176 in that direction, the out-turned end 242 and 244 of the associated rod 234 or 236 will engage the outer end of the end anchor 198 at the opposite end of the controller 174 and prevent further movement of the ball guide toward the other anchor. At that time, the associated bearing balls 190 or 194 will simply skid relative to the center race 176 when the center race continues to move after the associated ball guide is stopped. Subsequent movement of the center race in the opposite direction will then carry the ball guide back away from the end anchor in the usual manner of operation.

Thus, from the above embodiments, it will be seen that the invention provides controlled movement of the ball guides in a push-pull, ball-bearing, remote controller. In the first two embodiments, the controls are such as to control movement of the ball guides to exactly one-half the movement of the center race during operation of the controller. In the third embodiment, the movement of the ball guides is controlled independently of the movement of the center race, the ball guide movement being restricted as the ball guides approach too close to either end anchor of the controller. In any event, the controls according to the invention prevent contact of the ball guides with either end anchor of the controller and thereby prevent any possible damage to the guides.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. In a remote controller comprising a center race, two outer races, a ball guide carrying a plurality of balls between said center race and each of said outer races, flexible sheath means surrounding said outer races, and anchor means at ends of at least one of said outer races to enable at least the one outer race to take a reaction load, the improvement comprising elongate elements affixed to common ends of said ball guides and extending longitudinally beyond the common ends of said guides, and means movable with said elongate elements for controlling movement of said ball guides to prevent said ball guides from contacting the anchors of said controller.

2. A controller according to claim 1 characterized by said last-named means being mechanically connected to said center race to cause said ball guides to move in the same direction that said center race moves but through one-half the distance.

3. A controller according to claim 1 characterized by said last-named means comprising rack and pinion means connected to said elongate elements and to said center race.

4. A controller according to claim 3 characterized by the teeth of said rack and pinion means being of a ratio to cause said ball guides to move one-half the distance that said center race moves.

5. A controller according to claim 1 characterized by said last-named means comprising a plurality of pivotal linkages connected to said elongate elements and to said center race to limit the movement of said ball guides relative to the movement of said center race.

6. A controller according to claim 5 characterized by said linkages being of such lengths as to cause said ball guides to move half the distance that said center race moves.

7. A controller according to claim 5 characterized by said plurality of linkages comprising a first outer link having one end pivotally mounted in a fixed position, a second outer link having one end pivotally connected to said center race and having the other end pivotally connected to said first outer link, an intermediate link having one end pivotally connected to said elongate elements and having the other end pivotally connected to an intermediate portion of said first outer link, and a second intermediate link having one end pivotally connected to said elongate elements and having the other end connected to an intermediate portion of said second outer link.

8. A controller according to claim 7 characterized by said intermediate links connected to central portions of said outer links and said outer links being substantially twice the length of said intermediate links.

9. A controller according to claim 1 characterized by said last-named means comprising transverse means at end portions of said elongate elements and extending transversely thereof for contacting fixed means of said controller at one end thereof to limit the movement of said ball guides in a direction toward the other end of said controller.

10. A controller according to claim 9 characterized further by second elongate elements affixed to the opposite ends of said ball guides and extending longitudinally beyond the opposite ends of said guides, and second transverse means at end portions of said second elongate elements and extending transversely thereof for contacting fixed means of said controller at the other end thereof to limit movement of said ball guides in a direction toward the one end of said controller.

11. In a remote controller comprising a center race, two outer races, drive means for said center race, a ball guide carrying a plurality of balls between said center race and each of said outer races, and anchor means at ends of at least one of said outer races to enable at least the one outer race to take a reaction load, the improvement comprising elongate elements affixed to common ends of said ball guides and extending longitudinally of the controlled beyond the common ends of said guides, means forming a first gear rack connected to said elongate elements, means forming a second gear rack between said center race and with said drive means, and pinion gears meshing with said first and said second gear racks.

12. A controller according to claim 11 characterized by the teeth of said racks and pinion gears being of such a ratio as to cause said ball guides to move one half the distance that said center race moves.

13. A controller according to claim 11 characterized by said means forming a first gear rack being a sleeve surrounding said second gear rack and having a slot through which the teeth of said second gear rack are exposed.

14. In a remote controller comprising a center race, two outer races, drive means at one end of said center race for moving said center race longitudinally to operate responsive means at the other end of said center race, a ball guide carrying a plurality of balls between said center race and each of said outer races, and anchor means at ends of at least one of said outer races to enable at least the one outer race to take a reaction load, the improvement comprising elongate elements affixed to common ends of said ball guides and extending longitudinally of the controller beyond the common ends of said guides and a plurality of linkages connected to said elongate elements and to said center race to control the movement of said ball guides relative to the movement of said center race.

15. A controller according to claim 14 characterized by said linkages being of such links as to cause said ball guides to move one-half the distance that said center race moves.

16. A controller according to claim 14 characterized by said plurality of linkages comprising a first outer link having one end pivotally mounted in a fixed position, a second outer link having one end pivotally connected to said center race and having the other end pivotally connected to said first outer link, an intermediate link having one end pivotally connected to said elongate elements and having the other end pivotally connected to an intermediate portion of said first outer link, and a second intermdiate link having one end pivotally connected to said elongate elements and having the other end connected to an intermediate portion of said second outer link.

17. A controller according to claim 16 characterized by said intermediate links connected to central portions of said outer links and said outer links being substantially twice the length of said intermediate links.

18. In a remote controller comprising a center race, two outer races, a ball guide carrying a plurality of balls between said center race and each of said outer races, and anchor means at ends of at least one of said outer races to enable at least the one outer race to take a reaction load, the improvement comprising first elongate elements affixed to common ends of said ball guides and extending longitudinally of said controller beyond the common ends of said guides, second elongate elements affixed to the other common ends of said ball guides and extending longitudinally of said controller beyond the other ends of said guides, and transverse means affixed to all of said elongate elements and positioned to contact fixed portions of said controller for limiting the movement of said ball guides toward the other ends of the controller.

19. A remote controller according to claim 18 characterized by said anchors being the fixed portions of said controller contacted by said transverse means of said elongate element.

20. A remote controller according to claim 18 characterized by said ball guides being located on one side of the anchor means and the transverse means being on the other side of the anchor means.

* * * * *

UNITED STATES PATENT OFFICE
CERTIFICATE OF CORRECTION

PATENT NO. : 4,133,222
DATED : January 9, 1979
INVENTOR(S) : Richard A. Dooley

It is certified that error appears in the above-identified patent and that said Letters Patent are hereby corrected as shown below:

Column 1, line 16, change "other" to --outer--.

Column 8, line 51, change "controlled" to --controller--.

Signed and Sealed this

Eighth Day of May 1979

[SEAL]

Attest:

RUTH C. MASON
Attesting Officer

DONALD W. BANNER
Commissioner of Patents and Trademarks